(12) United States Patent
Serizawa et al.

(10) Patent No.: US 7,573,671 B2
(45) Date of Patent: Aug. 11, 2009

(54) DISK DEVICE WITH REDUCED FLUTTER

(75) Inventors: Kohji Serizawa, Kanagawa (JP);
Hitoshi Tsujino, Kanagawa (JP);
Hirokazu Tanizawa, Kanagawa (JP);
Motoji Takemoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 497 days.

(21) Appl. No.: 11/303,198

(22) Filed: Dec. 15, 2005

(65) Prior Publication Data
US 2006/0132967 A1 Jun. 22, 2006

(30) Foreign Application Priority Data
Dec. 22, 2004 (JP) .............................. 2004-371251

(51) Int. Cl.
*G11B 33/14* (2006.01)
(52) U.S. Cl. .................................................. 360/97.02
(58) Field of Classification Search ............. 360/97.02, 360/97.03, 97.04; 720/648; 55/385.5
See application file for complete search history.

(56) References Cited

U.S. PATENT DOCUMENTS

| | | | |
|---|---|---|---|
| 7,166,142 B2* | 1/2007 | Tuma et al. ................ | 55/385.6 |
| 7,203,030 B2* | 4/2007 | Chan et al. ................ | 360/97.02 |
| 2002/0131200 A1* | 9/2002 | Tomioka .................. | 360/97.02 |
| 2002/0135932 A1* | 9/2002 | Daniel et al. ............. | 360/97.02 |
| 2003/0058575 A1* | 3/2003 | Imai et al. ................ | 360/97.02 |
| 2003/0107839 A1* | 6/2003 | Smith ...................... | 360/97.02 |
| 2003/0227711 A1* | 12/2003 | Macpherson ............. | 360/97.02 |

FOREIGN PATENT DOCUMENTS

| | | |
|---|---|---|
| JP | 05-347089 | 12/1993 |
| JP | 11-073756 | 3/1999 |

\* cited by examiner

*Primary Examiner*—Tianjie Chen
(74) *Attorney, Agent, or Firm*—Townsend and Townsend and Crew LLP; Darren Gold (57) ABSTRACT

Embodiments of the invention provide a disk device capable of diminishing oscillation of a disk caused by an air flow which is created with rotation of the disk. In one embodiment, a magnetic disk device comprises a rotatable magnetic disk, a base and a top cover for housing the magnetic disk inside, a flow uniforming wall disposed along an outer periphery of the magnetic disk, and a circulation filter for collecting dust present within the device. The flow uniforming wall is positioned in opposition to the outer periphery of the magnetic disk and has a step height at a position other than the position opposed to the disk outer periphery, with an opening being formed by a gap between the step height and the top cover. This opening serves as an inlet port to admit an air flow created with rotation of the magnetic disk, and the circulation filter collects dust contained in the admitted air flow.

14 Claims, 10 Drawing Sheets

DISK DEVICE WITH REDUCED FLUTTER

CROSS-REFERENCES TO RELATED APPLICATIONS

This application claims priority from Japanese Patent Application No. JP2004-371251, filed Dec. 22, 2004, the entire disclosure of which is incorporated herein by reference.

BACKGROUND OF THE INVENTION

The present invention relates to a disk device capable of diminishing flutter caused by an air flow created with rotation of a disk.

Information read/write devices using various types of media such as optical disks and magnetic tapes are known. Among them, hard disk drives (HDDs) have become popular as storage devices for computers to such an extent that they are one type of the storage devices indispensable for today's computers. Further, not limited to computers, their application is widening more and more due to the superior characteristics with the advent of moving picture recording/reproducing devices, car navigation systems, removable memories used in digital cameras and so on.

The hard disk drive comprises a magnetic disk for storing data, a head which reads and/or writes data with respect to the magnetic disk, and an actuator for moving the head up to a desired position on the magnetic disk. The actuator is driven by a voice coil motor and is adapted to move pivotally about a pivot shaft, thereby causing the head to move radially over the magnetic disk. As a result, the head makes access to a desired track formed on the magnetic disk and can read and/or write data.

Within a mechanical portion (Hard Disk Assembly (HDA)) sealed hermetically by a base and a top cover in this hard disk drive (HDD), in order to ensure the reliability of the head-disk interface, it is necessary to remove lubricating oil leaking out from the actuator for actuating the magnetic head and also remove fine dust which may be generated due to wear of the drive mechanism. To meet this requirement, a circulation filter for the collection of dust is disposed within the HDA at a position where a pressure difference occurs. As the magnetic disk rotates, an air flow occurs along the outer periphery of the disk and in the disk rotating direction. By passing of this air flow through the circulation filter it is possible to remove dust contained in the air flow.

As the recording track pitch in HDD becomes shorter, a higher tracking accuracy is demanded. However, oscillation of the magnetic disk during rotation of the disk exerts a great influence on the accuracy of tracking operation. Although an air flow is created with rotation of the disk within the HDA, this air flow is allowed to advance smoothly by a flow uniforming wall which is provided in a partially intermittent form along the outer periphery of the disk, thereby suppressing oscillation of the disk caused by the air flow. Therefore, it is preferable that the flow uniforming wall be formed as continuously as possible. But in a place where the circulation filter is disposed, for example in a corner of the HDA, the flow uniforming wall usually becomes discontinuous because there are formed an inlet for admitting the air flow to the circulation filter and an outlet for exit of the air flow from the same filter.

In this connection, an information recording medium driving device described in Patent Document 1 (Japanese Pat. Laid-Open No. Hei 11-73756) includes a flow uniforming wall formed in a corner portion of a casing which houses a disk-like information recording medium therein, the flow uniforming wall functioning to uniform an air flow created along the outer periphery of the information recording medium and in a rotating direction of the same medium, and a circulation filter for collecting dust contained in the air flow which is introduced behind the flow uniforming wall through an inlet opening formed in the flow uniforming wall. An increase of oscillation of a magnetic disk caused by disturbance of the air flow which occurs along the outer periphery of the disk during high-speed rotation of the disk is prevented by adjusting the relation d/L between a corner length L along the outer periphery of the information recording medium and the width d of the inlet opening.

BRIEF SUMMARY OF THE INVENTION

In the technique disclosed in Patent Document 1, since an inlet opening which reaches the bottom of the base is provided for admission of the air flow, the flow uniforming wall formed along the outer periphery of the disk becomes discontinuous at the position where the inlet opening is formed, whereby the air flow is disturbed, causing oscillation of the disk.

The present invention has been accomplished for solving the above-mentioned problem and it is a feature of the invention to provide a disk device which can diminish oscillation of the disk caused by an air flow created with rotation of the disk.

A disk device according to an aspect of the present invention comprises a rotatable disk, a base and a top cover for housing the disk inside, a flow uniforming wall disposed along an outer periphery of the disk, and a circulation filter for collecting dust present within the device, the flow uniforming wall having an opening formed in a position other than the position opposed to the outer periphery of the disk, allowing an air flow created with rotation of the disk to be admitted through the opening.

In the prior art, the flow uniforming wall is discontinuous on both inlet side for admitting the air flow to the circulation filter and the outlet side for exit of the air flow. In the present invention, an opening serving as an inlet port is formed in a position other than the position opposed to the outer periphery of the disk, so that the flow uniforming wall on the inlet side can be formed continuously, whereby the air flow created with rotation of the disk can be allowed to flow smoothly.

In this case, the flow uniforming wall may have a first opening in a position between a top surface of the disk and the top cover, allowing an air flow created with rotation of the disk to be admitted through the first opening. Thus, the opening can be formed between the disk top surface and the top cover in a position other than the position opposed to the outer periphery of the disk.

Two or more disks may be provided, and the flow uniforming wall may have a second opening positioned in a gap between the two or more disks, allowing an air flow created with rotation of the disks to be admitted through the second opening. Thus, when two or more disks are used, the opening can be formed between the disks.

The flow uniforming wall may have a third opening between a lowest surface of the disk(s) and a bottom of the base, allowing an air flow created with rotation of the disk(s) to be admitted through the third opening. Thus, the opening can be formed between the disk lowest surface and the base bottom in a position other than the position opposed to the outer periphery of the disk.

The flow uniforming wall may be formed integrally with the base. In this case, the manufacture becomes easier and the provision of a new part for making the flow uniforming wall continuous on the inlet side can be made unnecessary.

The disk device may further comprise a gasket for sealing the top cover and the base, and the height of the first opening in the direction of a rotational axis of the disk may be equal to the thickness of the gasket. Thus, the opening can be formed by forming a stepped portion in the flow uniforming wall, whereby the manufacture becomes easier and a larger opening can be provided.

According to the disk device of the present invention it is possible to diminish oscillation of the disk which is caused by an air flow created with rotation of the disk.

DETAILED DESCRIPTION OF THE INVENTION

An embodiment of the present invention will be described in detail hereinunder with reference to the drawings. In this embodiment the present invention is applied, for example, to a 2.5 type hard disk drive (HDD) of high-speed rotation and high TPI.

Figure 1:
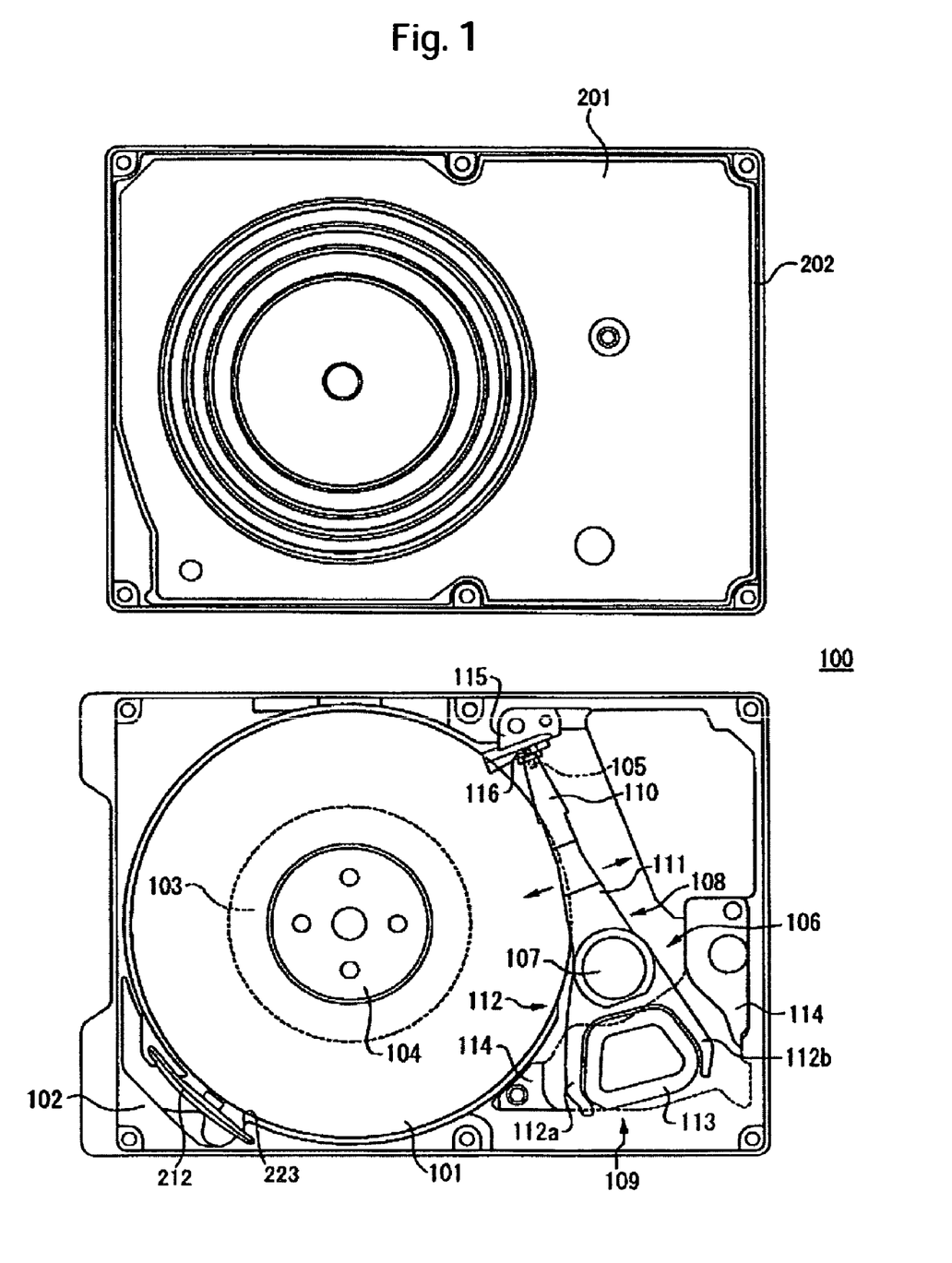
FIG. 1 is a plan view showing a schematic construction of an HDD according to an embodiment of the present invention.
Figure 2:
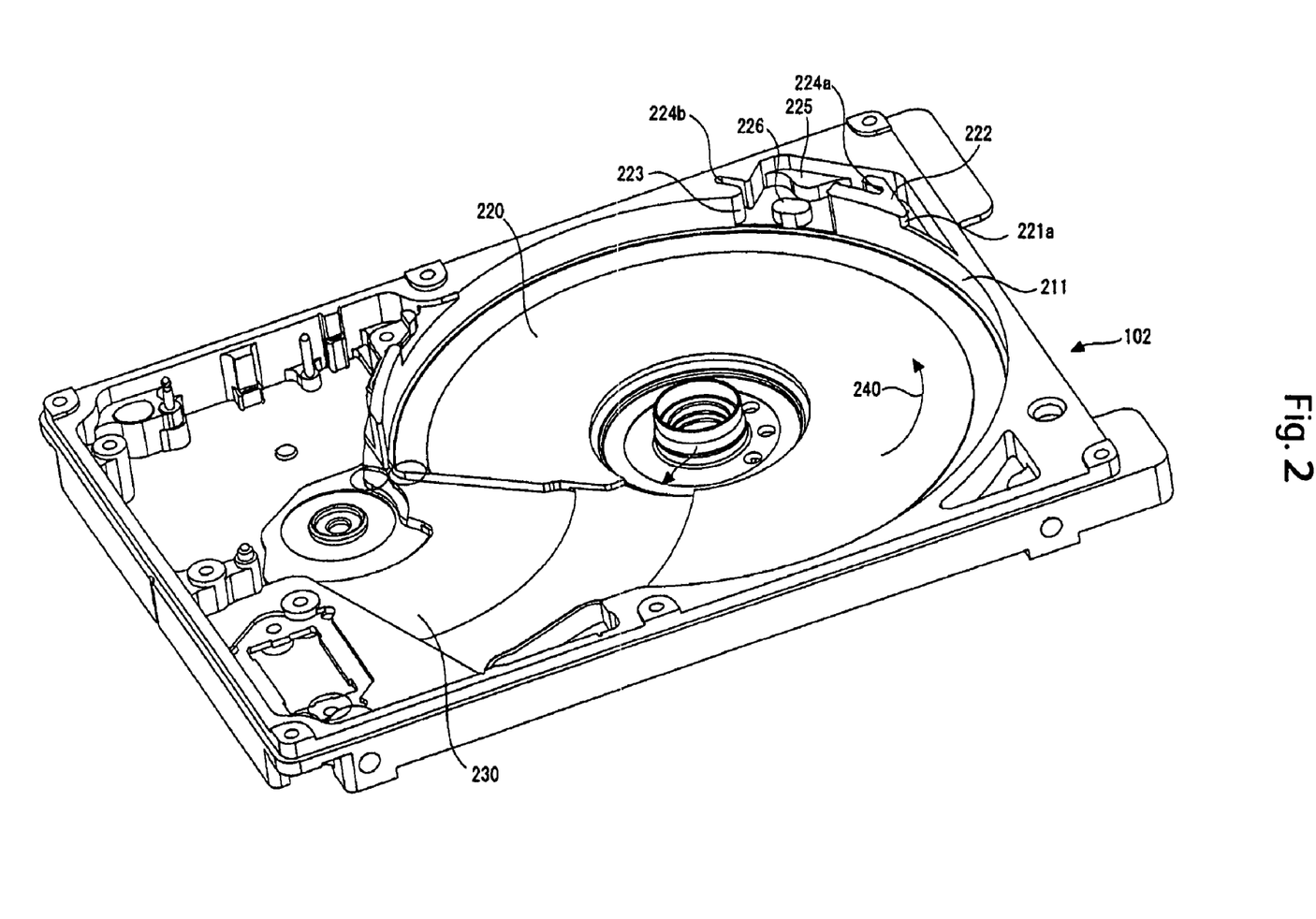
FIG. 2 is a perspective view showing a base and a top cover in the HDD of the embodiment.
Figure 3:
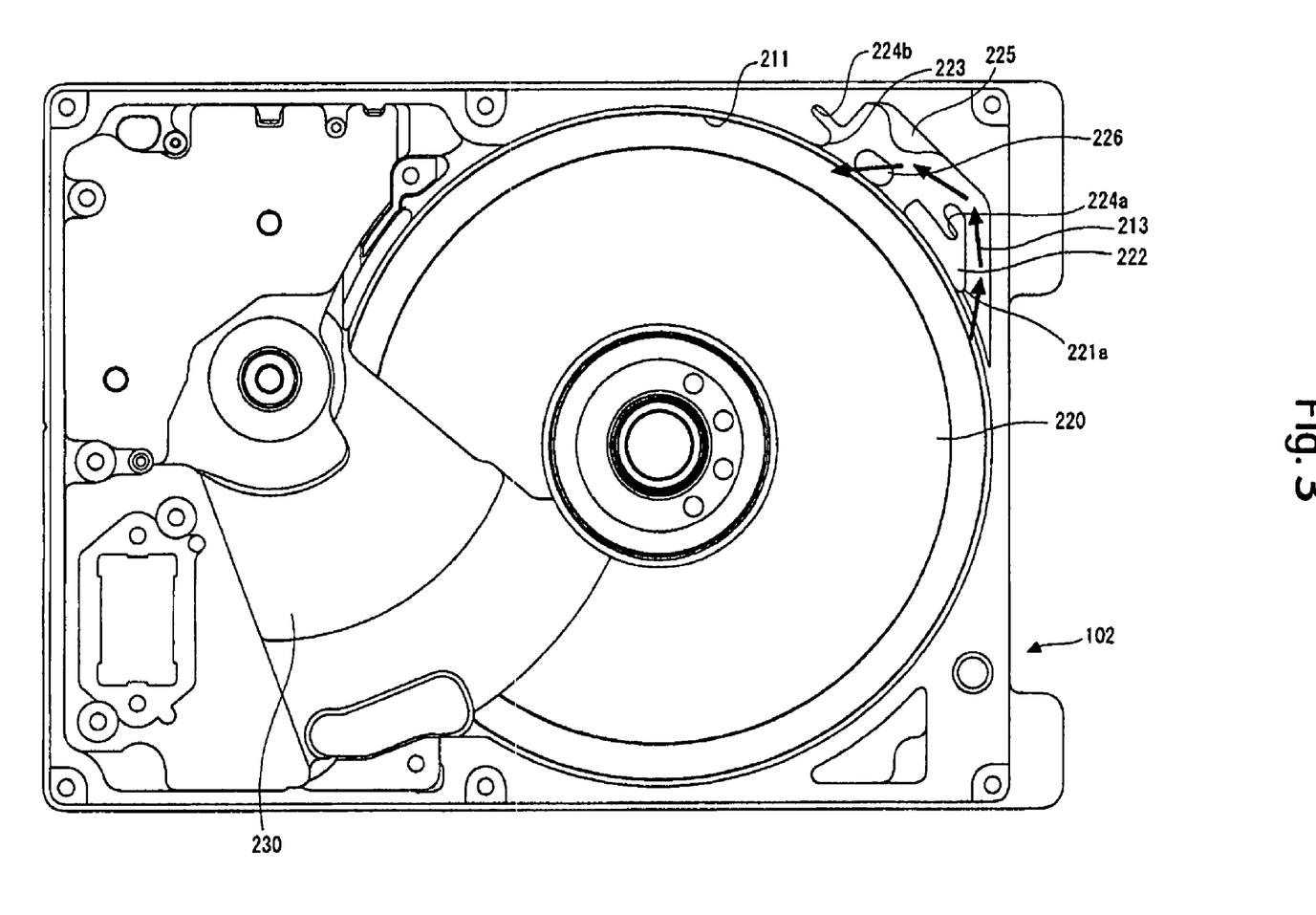
FIG. 3 is a plan view of the base.
Figure 4:
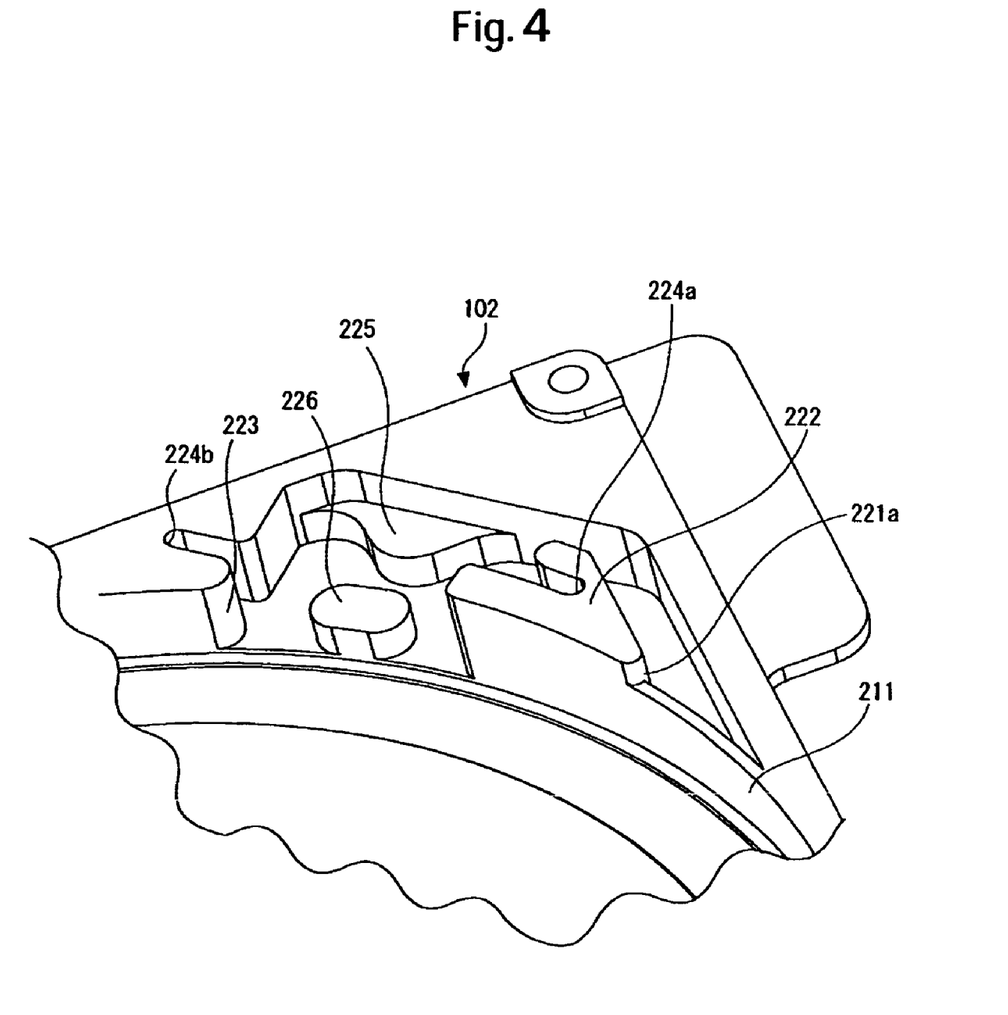
FIG. 4 is an enlarged perspective view of a portion of the base where a circulation filter is disposed.

FIG. 1 is a plan view showing a schematic construction of the HDD, indicated at 100, of this embodiment, FIG. 2 is a perspective view showing a base, FIG. 3 is a plan view of the base, and FIG. 4 is an enlarged perspective view of a circulation filter portion which is for collecting dust present inside an enclosure of the HDD to keep the interior of the enclosure clean.

In FIG. 1, the numeral 101 denotes a data recording disk. The disk is a non-volatile magnetic disk of the type in which data are stored by magnetization of a magnetic layer. Numeral 102 denotes a base for accommodating various components of the hard disk drive 100. The base 102 is fixed through a gasket 202 to a cover 201 which closes an upper opening of the base, thereby constituting a disk enclosure which can accommodate various components of the hard disk drive 100 in a hermetically sealed state.

In particular, in the base 102 used in this embodiment, a flow uniforming wall 211 is formed substantially continuously along the outer periphery of the magnetic disk 101 so that an air flow created with rotation of the magnetic disk 101 advances smoothly. More specifically, the flow uniforming wall 211 is formed along the outer periphery of the magnetic disk 101 except the position through which an actuator arm 108 to be described later moves pivotally and except an outlet port 223 for exit of the air flow from a circulation filter 212. The circulation filter 212 is disposed at a corner of the base 102 and an air flow 213 created with rotation of the magnetic disk 101 is admitted to the corner. The circulation filter 212 collects dust contained in the air flow 213, and the air flow which has passed through the filter 212 is discharged from the outlet port 223.

Numeral 103 denotes a spindle motor and numeral 104 denotes a hub provided in the spindle motor 103. Numeral 105 denotes a head which writes and/or reads data inputted and outputted between the head and a host to and/or from the magnetic disk 101. The head 105 includes a write element which converts an electric signal to a magnetic field in accordance with storage data to be recorded to the magnetic disk 101 and/or a read element which converts the magnetic field provided from the magnetic disk 101 to an electric signal, and a slider with the write element and/or the read element formed on a surface thereof. As a result of dust collection by the circulation filter 212 it is possible to prevent head crash caused by the inclusion of dust between the head 105 and the magnetic disk 101.

Numeral 106 denotes an actuator which holds and moves the head 105. The actuator 106 is held pivotably by a pivot shaft 107 and includes an actuator arm 108 and a VCM (voice coil motor) 109 as a drive mechanism. The actuator arm 108 includes a suspension 110, a head arm 111 and a coil support 112 which are connected in this order from a front end portion of the actuator arm with the head 105 disposed thereon.

Numeral 113 denotes a flat coil and numeral 114 denotes an upper stator magnet holding plate fixed to the base 102. In the illustrated upper stator magnet holding plate 114, a main portion thereof is cut out for the sake of convenience and the profile thereof is indicated by a broken line. Though not shown, a lower stator magnet holding plate is disposed below the flat coil 113 so as to sandwich the flat coil 113 between it and the upper stator magnet holding plate 114. The VCM 109 includes the flat coil 113, a stator magnet (not shown) fixed to the upper stator magnet holding plate 114, and a stator magnet (not shown) fixed to the lower stator magnetic holding plate. Numeral 115 denotes a ramp mechanism for retraction of the magnetic disk 101 from the head 105 when the rotation of the disk is stopped. Numeral 116 denotes a tab formed at a front end portion of the suspension 110. The actuator 106 used in this embodiment is also applicable to a CSS (Contact Start and Stop) system wherein the head is retracted to a zone defined on the inner periphery side of the magnetic disk 101.

The magnetic disk 101 is held integrally by the hub 104 of the spindle motor 103 which is fixed to the bottom of the base 102, and is rotated at a predetermined speed by the spindle motor 103. When the hard disk drive 100 is not in operation, the magnetic disk 101 is at standstill. The coil support 112 held pivotably by the pivot shaft 107 is formed with coil support arms 112a and 112b. The coil support arms 112a and 112b hold the flat coil 113 on the side opposite to the head arm 111 with respect to the pivot shaft 107. In accordance with a drive signal flowing from a controller (not shown) to the flat coil 113 the VCM 109 causes the actuator arm 108 to pivot about the pivot shaft 107, allowing the head 105 to move to a position over the magnetic head 101. Alternatively, the head 105 can be moved outside the magnetic disk 101.

For read or write of data with respect to the magnetic disk 101, the actuator 106 causes the head 105 to move to a position over the data area defined on the surface of the magnetic disk 101 which is rotating. As the actuator 106 moves pivotally, the head 105 moves in a radial direction of the disk surface. In this way the head 105 can access a desired track. The head 105 flies over the magnetic disk 101 through a certain gap as a result of balance between a pressure based on the viscosity of air present between an ABS (Air Bearing Surface) of the slider opposed to the magnetic disk 101 and the same disk which is rotating and a pressure applied by the suspension 110 toward the magnetic disk 101.

When the rotation of the magnetic disk 101 stops, the head 105 comes into contact with the surface of the magnetic disk 101, giving rise to problems caused by an attracting phenomenon, such as scratching of the data area and failure to rotate of the magnetic disk. To avoid these problems, when the rotation of the magnetic disk 101 stops, the actuator 106 causes the head 105 to be retracted from the data area to the ramp mechanism 115. The actuator 106 moves pivotally toward the ramp mechanism 115 and a tab 116 formed at a front end portion of the actuator 106 moves while sliding on the surface of the ramp mechanism 115 and gets on a parking surface on the ramp mechanism, whereby the magnetic head 105 is unloaded. For loading the magnetic head 105, the actuator 106 which has been supported on the parking surface leaves the ramp mechanism 115 and moves to a position over the surface of the magnetic disk 101.

The magnetic disk 101 comprises one or plural disks. It is optional whether the magnetic disk 101 is to be a one-side recording type or a double-side recording type. For double-side recording, suspensions which hold heads for scanning the recording surfaces are provided in a number corresponding to the number of the recording surfaces, and for each magnetic disk 101, suspensions are fixed in such a manner that one suspension is fixed to the coil support 112 through a head arm and another suspension is fixed to the coil support 112 through a head arm at a position overlapping the one suspension through a predetermined spacing with respect to the magnetic disk. In double-side recording for plural magnetic disks, the plural magnetic disks are held integrally by the hub 104 through a predetermined spacing in the rotational axis direction of the spindle motor 103. Suspensions which hold heads for scanning the recording surfaces are provided in a number corresponding to the number of the recording surfaces and are fixed to the coil support 112 through head arms at positions overlapping the suspension 110 shown in FIG. 1 through predetermined spacings.

The HDD 100 of this embodiment will now be described in more detail. As mentioned above, a recess (accommodating portion) 220 which is almost equal in shape to the profile of the magnetic disk 101 is formed in the base 102 of the HDD 100 so that the magnetic disk 101 is disposed therein. One or plural magnetic disks 101 are accommodated within the accommodating portion 220. In this embodiment, the disk rotates in the direction of arrow 240 in FIG. 2. The bottom of the accommodating portion 220 where the magnetic disk or disks are disposed is the bottom of the base 102, but is formed higher than the bottom of an accommodating portion 230 where the actuator arm 108 is disposed. This is because the closer to the magnetic disk 101 the bottom of the accommodating portion 220 where the magnetic disk(s) 101 is disposed, that is, the smaller the distance between the lower surface of the magnetic disk(s) and the bottom of the accommodating portion 230 opposed to the lower surface, the more suppressed the oscillation caused by an air flow which is created with rotation of the magnetic disk 101(s).

A side wall (flow uniforming wall 211) of the accommodating portion 220 for each magnetic disk 101 is formed along and in opposition to the outer periphery of the magnetic disk. With the flow uniforming wall 211, the disturbance of an air flow created along the outer periphery of the magnetic disk 101 with rotation of the disk is suppressed and the influence of oscillation of the disk caused by the disturbance of the air flow is suppressed. Therefore, it is preferable that the flow uniforming wall 211 be formed continuously through the entire outer periphery of the magnetic disk 101 in order to ensure a smooth passing of the air flow created along the outer periphery of the disk. In the prior art, as noted earlier, the flow uniforming wall 211 is discontinuous at the pivoting position of the actuator arm 108 and in the inlet and outlet ports of the air flow to and from the circulation filter 212.

For smoothing the air flow to suppress the flutter it is preferable that the flow uniforming wall 211 be formed as continuously as possible. Moreover, with the recent tendency to an increase in storage capacity of the magnetic disk 101 and consequent narrowing of TPI of the disk, the influence of oscillation becomes greater and it is desired to minimize oscillation. In view of these circumstances and for the purpose of making the flow uniforming wall as continuous as possible, the present inventors have made extensive studies and found out that a more outstanding effect of suppressing the disturbance of air flow and suppressing the flutter is attained by forming a flow uniforming wall continuously on the inlet port side than in case of forming a flow uniforming wall on the outlet port side and that the formation of a flow uniforming wall on the inlet port side does not exert a great influence on the dust collecting effect although the size of the outlet port is substantially reduced and the amount of incoming air flow decreases. The inventors have also found out that by forming an air flow inlet port for the circulation filter 212 in a position higher than the upper surface of the magnetic disk 101, it is possible to increase the continuity of the flow uniforming wall 211 and improve the flutter suppressing effect while maintaining the dust collecting effect of the circulation filter 212 as far as possible.

In this embodiment, out of the air flow inlet and outlet ports for the circulation filter where the flow uniforming wall becomes discontinuous in the prior art, the inlet port is formed in a position higher than the top surface of the disk to make the flow uniforming wall continuous in the inlet port portion. Although the inlet port 221 becomes smaller than in the prior art, the amount of incoming air flow does not so much decrease and the dust collecting effect is not so greatly influenced because the number of revolutions of the magnetic disk is high.

In the HDD 100 of this embodiment, a support portion 222 for supporting the circulation filter 212 is formed at an end portion of the flow uniforming wall 211 and a step height 221a for inlet port is provided on a side of the support portion 222. Although in this embodiment the flow uniforming wall 211 is formed integrally with the base 102, for example a member serving as the flow uniforming wall may be disposed at the position where an inlet port has heretofore been formed. However, in case of the flow uniforming wall 211 being integral with the base 102, the manufacture is easier and it is also possible to reduce the manufacturing cost because a new part for forming a flow uniforming wall in the inlet port is not needed.

Figure 5:
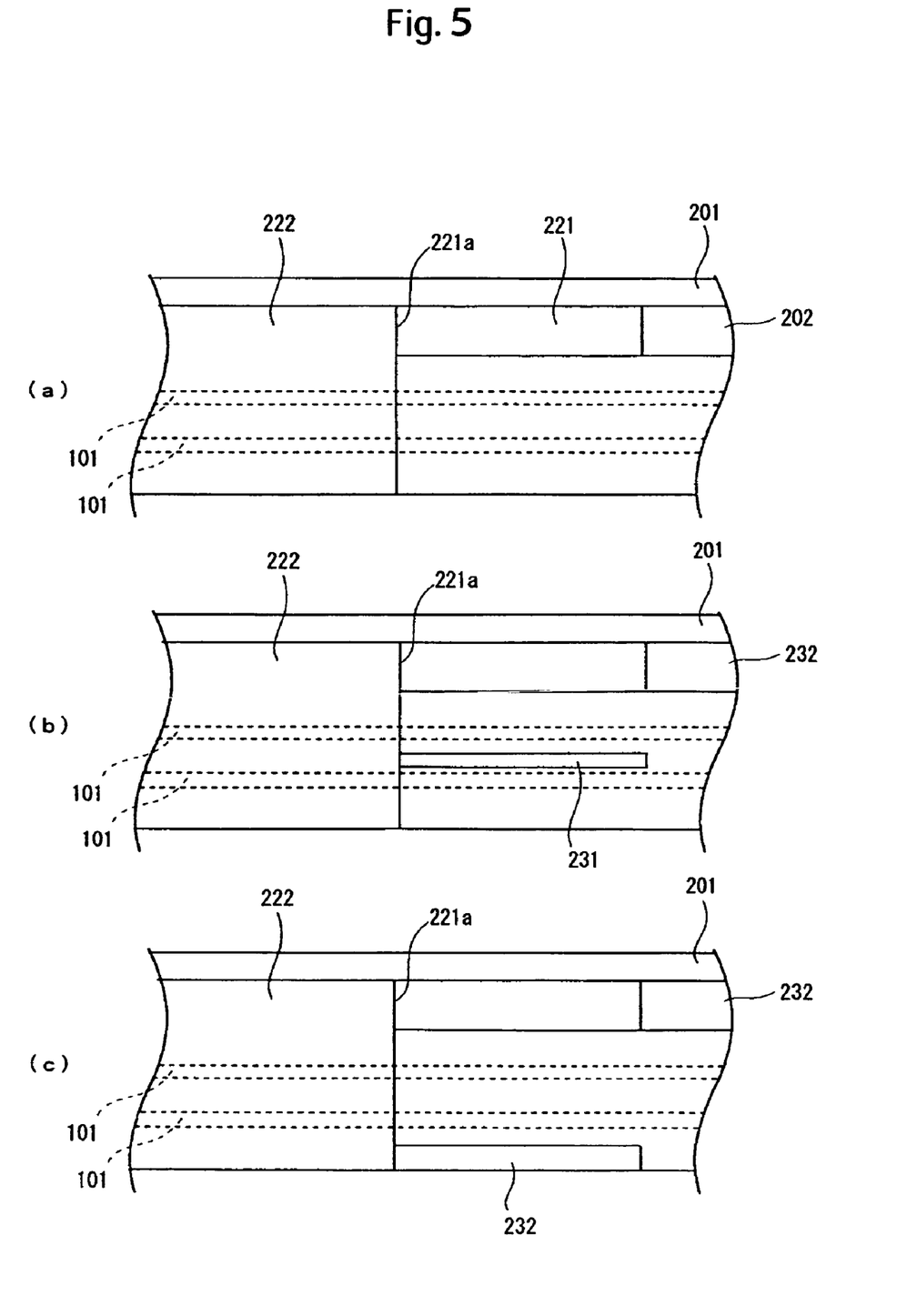
FIG. 5(a) is a schematic diagram showing an inlet port in the embodiment and FIGS. 5(b) and 5(c) are schematic diagrams showing modifications of the embodiment.

FIG. 5(a) is a schematic diagram showing an inlet port formed in this embodiment. The step height 221a shown in FIG. 2 defines an opening in cooperation with the top cover 201, which opening serves as an inlet port 221. More specifically, as shown in FIG. 5(a), the top cover 201 is fixed to the base 102 through a gasket which is disposed along an edge portion of the top cover. Consequently, the inlet port 221 is defined by the step height 221a and the thickness of the gasket 202.

The inlet port 221 is formed in a position at least higher than the upper surface of the magnetic disk 101, as shown in FIG. 5(a). In case of using plural magnetic disks 101, the inlet port 221 is formed in a position higher than the upper surface (hereinafter referred to as the "top surface") of the magnetic disk 101 positioned closest to the top cover 201. Thus, below the inlet port 221, as in the other portion, there is formed the flow uniforming wall 211 along the outer periphery of the magnetic disk 101. As long as the flow uniforming wall 211 lies at least in the position opposed to the outer periphery of the magnetic disk 101, as compared with the case where it is made discontinuous by the inlet port 221, the air flow created with rotation of the magnetic disk 101 can be allowed to advance smoothly and it is possible to suppress disturbance of the air flow caused by the inlet port 221.

The surface of the support portion 222 provided at an end portion of the flow uniforming wall 211 which surface is opposed to the outer periphery of the magnetic disk 101 constitutes the flow uniforming wall and has a smooth shape conforming to the shape of the outer periphery of the magnetic disk 101. In the flow uniforming wall 211, an opening (recess) is formed in an end of the support portion 222 and the wall 211 becomes discontinuous at this position. This opening serves as an outlet port 223 for the air flow incoming from the inlet port 221. The circulation filter 212 is disposed on a side of the outlet port 223 to collect dust contained in the air flow entering from the inlet port 221. For supporting the circulation filter 212 grippingly there are formed a stepped portion 226 projecting from the bottom of the base 102 and a convex portion 225 projecting from a side wall of the base 102. Further, a concave portion 224a for insertion therein of the circulation filter 212 is formed in the support portion 222 on one end side of the outlet port 223, and also on an opposite end side there is formed a concave portion 224b in the flow uniforming wall. The circulation filter 212 is for example in the shape of a generally rectangular plate and both end portions thereof (short sides of the rectangle) are inserted into the two concave portions 224a and 224b. Moreover, upper and lower surfaces of the circulation filter 212 are held grippingly by the stepped portion 226 and the convex portion 225. In this way the circulation filter 212 is supported.

Although in this embodiment the inlet port 221 is formed in a position higher than the upper surface of the magnetic disk 101, or higher than the top surface of plural magnetic disks if any, this constitutes no limitation insofar as the flow uniforming wall 211 is made continuous at the position opposed to the outer periphery of the magnetic disk 211. Thus, an opening may be formed as an inlet port in a position other than the position opposed to the outer periphery of the magnetic disk 101. For example, in the case of an HDD having two magnetic disks 101, as shown in FIG. 5(b), an opening may be formed as an inlet port 231 between the magnetic disk 101 located on the bottom side of the base 102 and the magnetic disk 101 located on the top cover 201 side. An inlet port 232 may be formed in a position lower than the lower surface (bottom surface) of the magnetic disk located on the bottom side of the base, as shown in FIG. 5(c). Further, one or both of the inlet ports 231 and 232 may be provided together with the inlet port 221 formed in the top surface of the magnetic disk 101. In this way it is possible to increase the amount of air flow entering the circulation filter 212 and hence possible to let the filter 212 collect dust more quickly.

Figure 6:
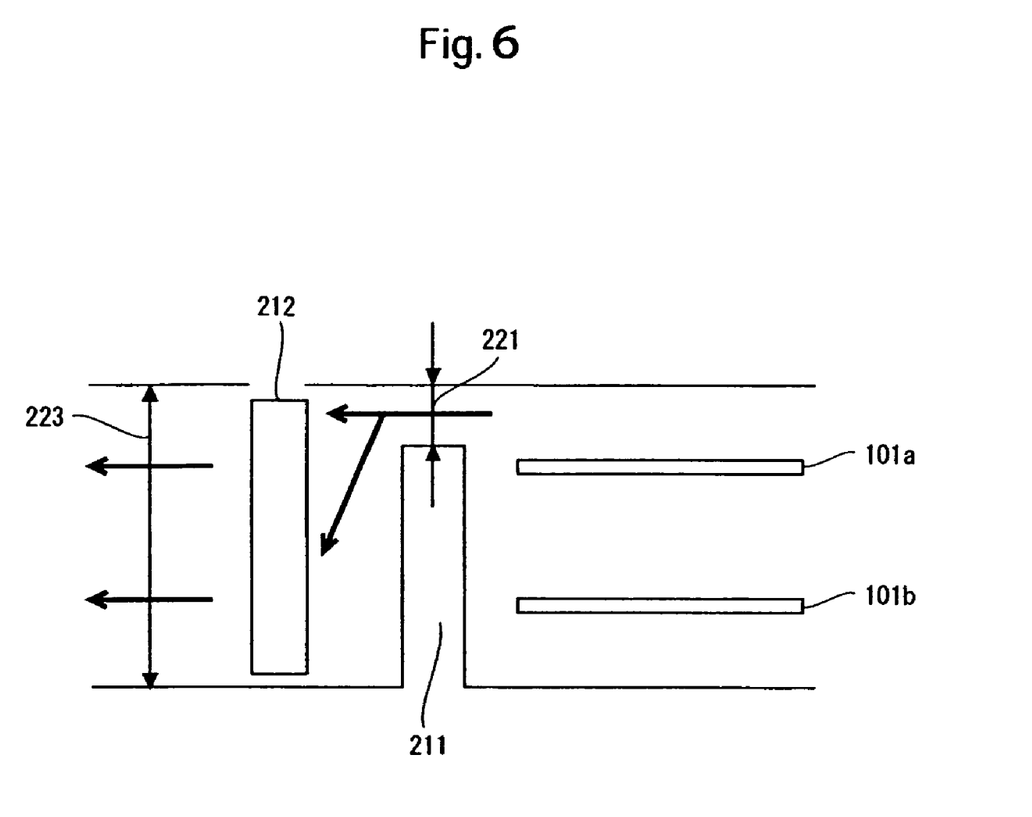
FIG. 6 is a diagram showing in what manner an air flow which has passed through the inlet port goes out from an outlet port through the circulation filter.

FIG. 6 illustrates in what manner an air flow which has entered the circulation filter 212 goes out from the outlet port 223. An air flow created with rotation of magnetic disks 101a and 101b enters the circulation filter 212 from the inlet port 221, then dust contained therein is collected by the filter 212, and the thus-cleaned air flow goes out from the outlet port 223.

The following description is provided about the effect of the present invention while making comparison between the HDD of this embodiment wherein the flow uniforming wall is actually formed in the inlet port and the conventional HDD wherein the flow uniforming wall is made discontinuous by the inlet port. Generally, as the track density becomes higher with an increase of the recording density, it becomes difficult to retain the head with a high accuracy on the center line of a desired track. As one worsening factor of the head positioning accuracy there is known what is called Disk Runout which indicates a relative runout between the head and the disk medium. This disk runout is classified into Repeatable Runout (RRO) (primary runout) which appears repeatedly in synchronism with rotation of a spindle motor for rotating the disk and Non-Repeatable Runout (NRRO) not synchronized with the rotation. Both cause an increase of a position error signal (PES).

With an increase in air resistance (windage loss) of a rotating member, including the disk, caused by the recent increase in rotational speed of the disk, the aforesaid runout error increases more and more. For example, in order to follow up a track at the time of writing or reading user data to or from the track, there is performed a processing to diminish from the position error signal PES the influence caused by windage loss which is induced with rotation of the disk. However, for the execution of such a processing it is necessary to produce a correction signal on the basis of servo data and control the VCM 109, etc. in accordance with the correction signal. Thus, the processing becomes complicated.

Figure 7:
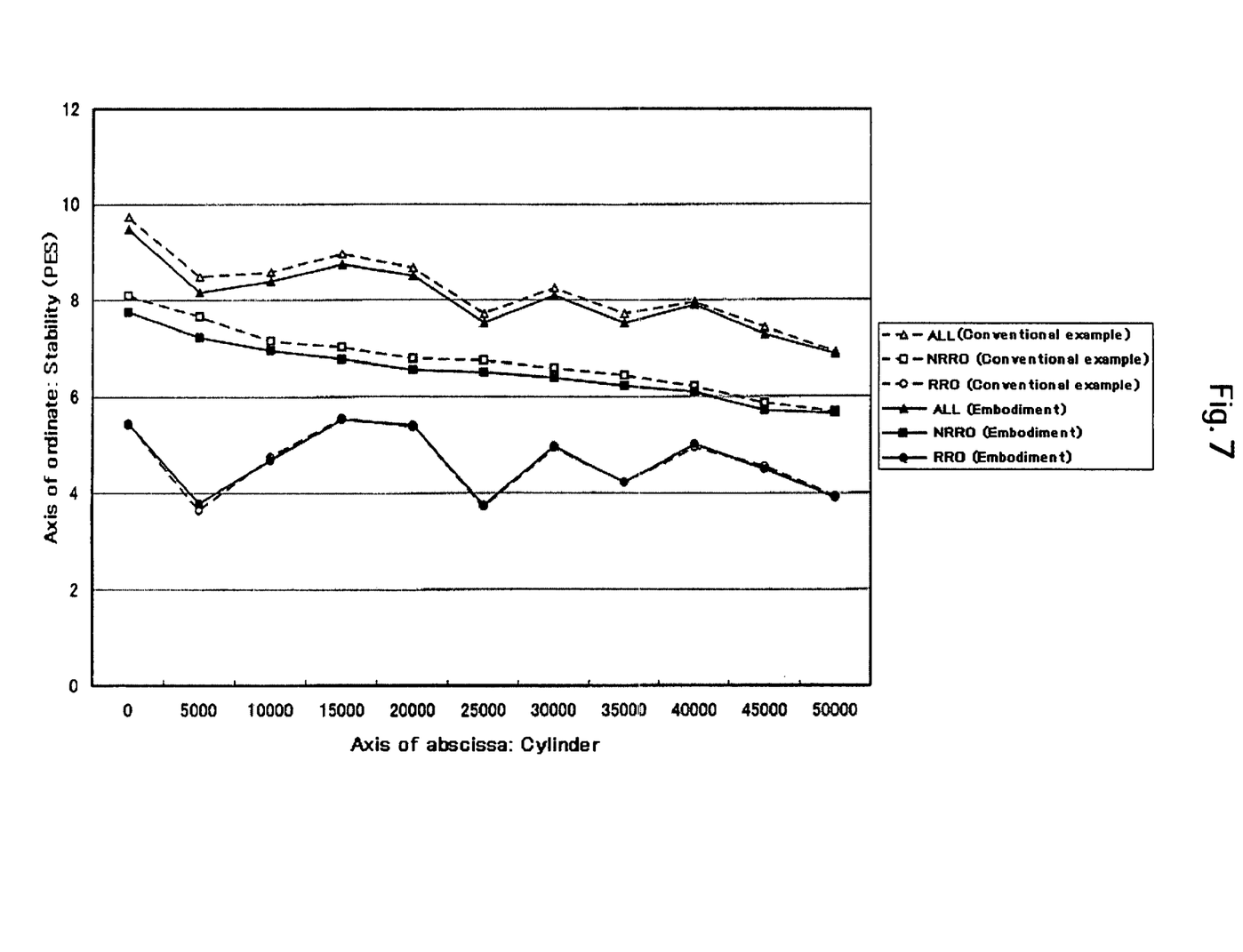
FIG. 7 is a graph in which servo stability (PES) and cylinder number are plotted along the axis of ordinate and the axis of abscissa, respectively, showing a comparison between the HDD (embodiment) according to the present invention and a conventional HDD (conventional example) free of a flow uniforming wall in the inlet port.
Figure 8:
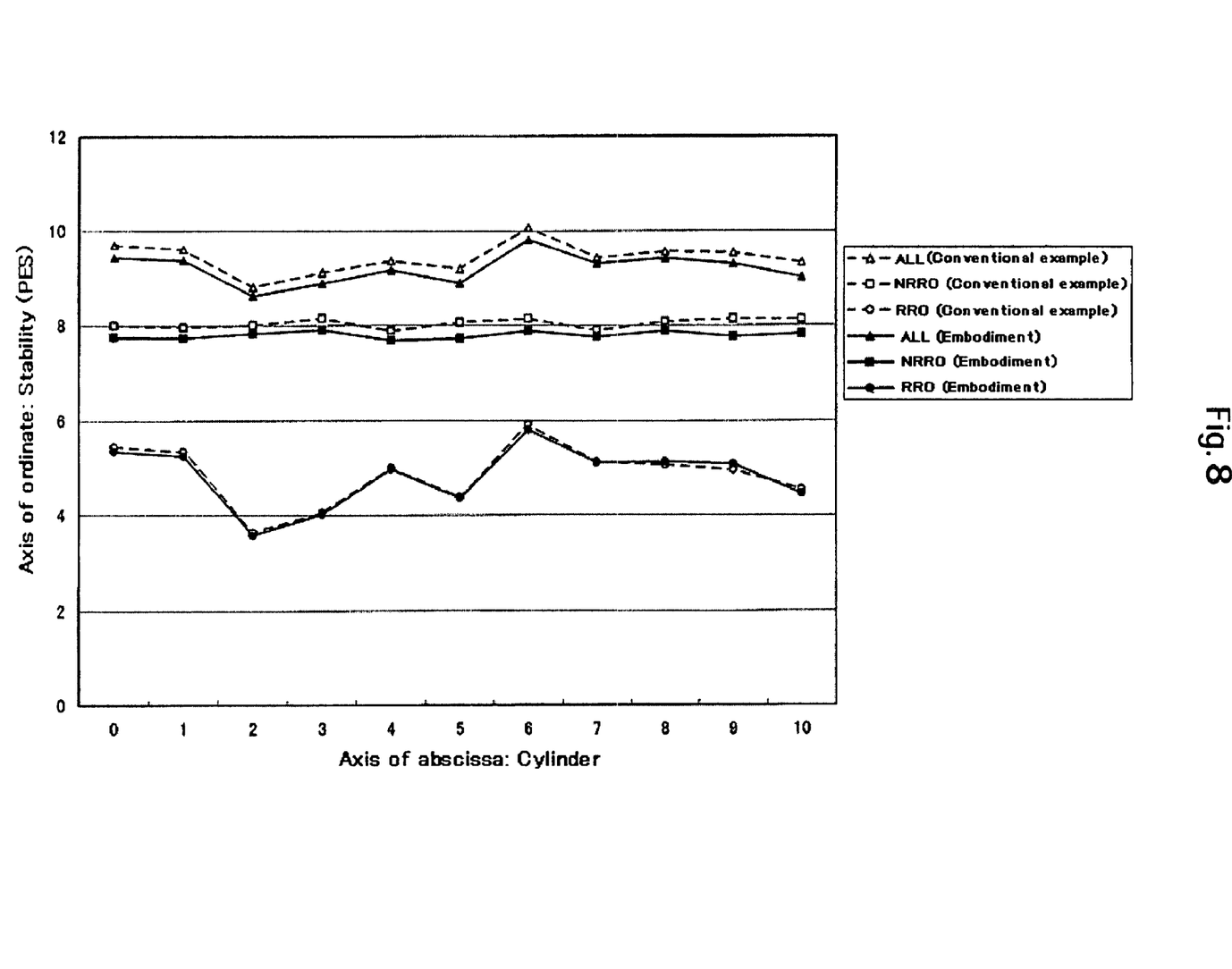
FIG. 8 is a graph showing, on a larger scale, cylinder numbers 0 to 10 shown in FIG. 7.
Figure 9:
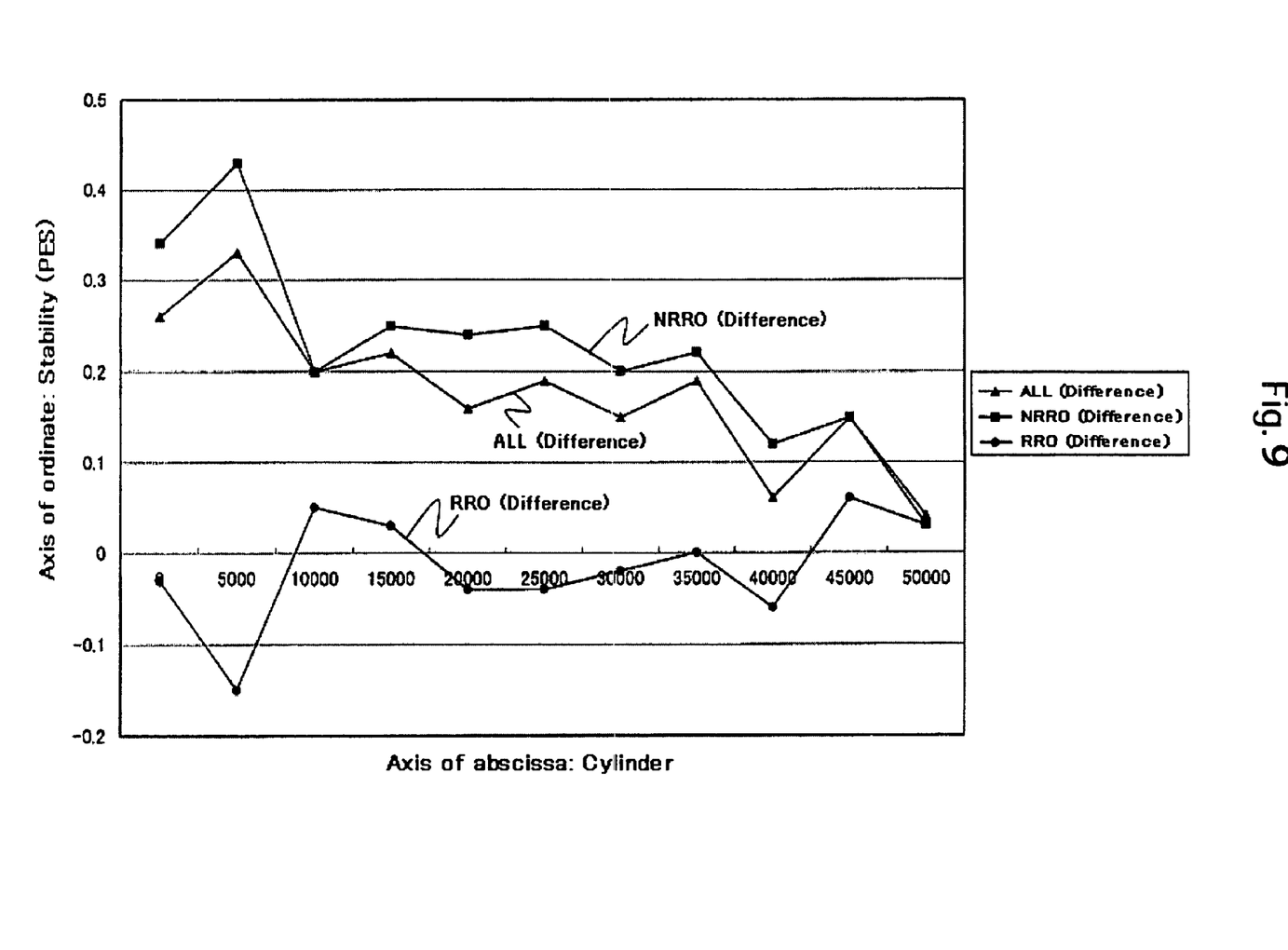
FIG. 9 is a graph in which a difference in servo stability (PES) between the embodiment and the comparative example is plotted along the axis of ordinate and cylinder number plotted along the axis of abscissa, showing a comparison between the HDD (embodiment) according to the present invention and the conventional HDD (conventional example) free of a flow uniforming wall in the inlet port.
Figure 10:
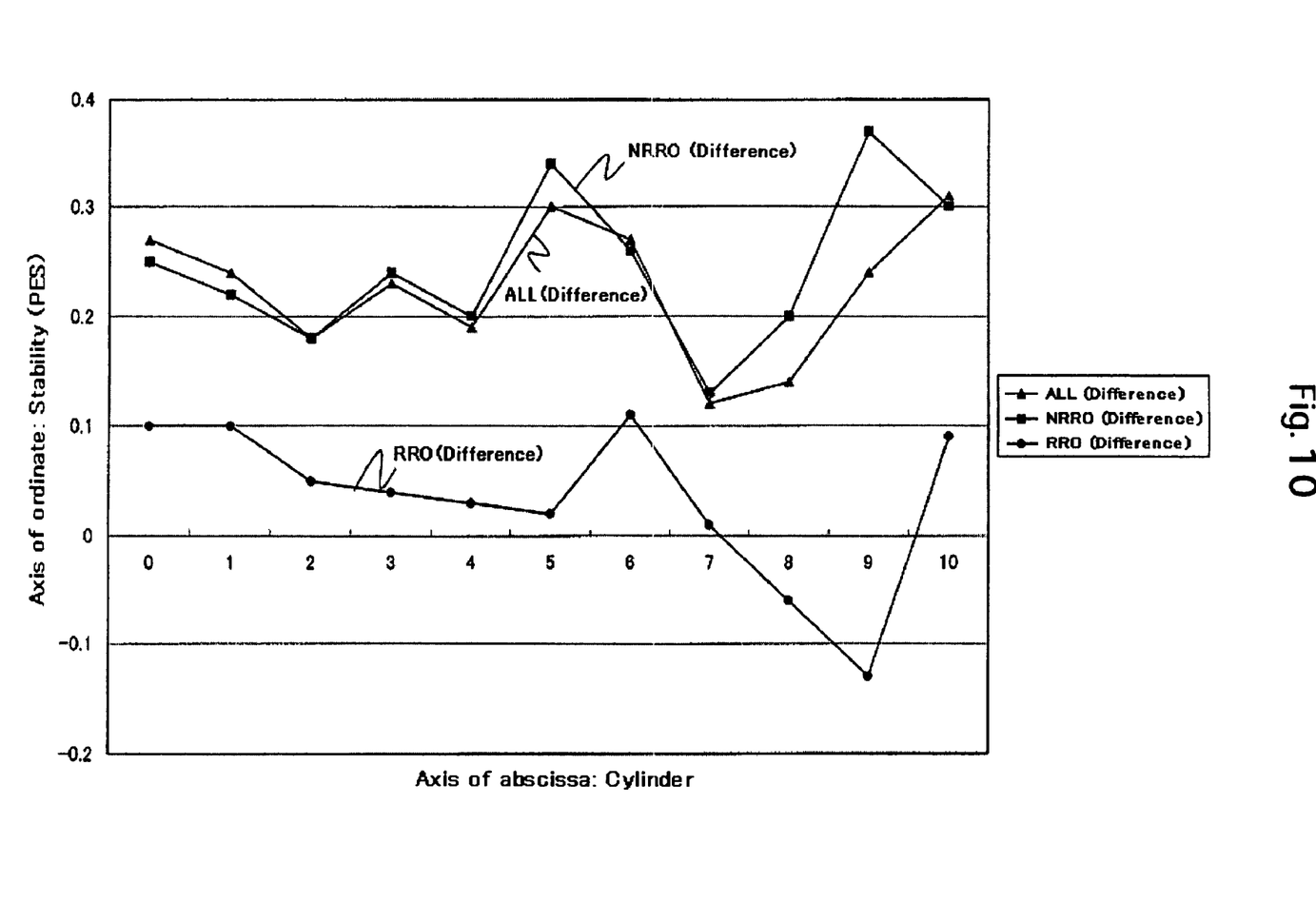
FIG. 10 is a graph showing, on a larger scale, cylinder numbers 0 to 10 shown in FIG. 9.

For explaining the effect of the present invention, the present inventors have divided one track into 256 units (PES), with 128 as the center, and measured the magnitude of PES discrepancy to determine servo stability. FIGS. 7 and 8 are graphs in which servo stability and track (cylinder) number are plotted along the axis of ordinate and the axis of abscissa, respectively, and a comparison is made between the HDD (embodiment) according to the present invention and the conventional HDD (prior art) free of a flow uniforming wall in the inlet port. FIGS. 9 and 10 are graphs in which a difference in PES between the embodiment and the comparative example is plotted along the axis of ordinate and the cylinder number plotted along the axis of abscissa and which shows that servo stability is improved by the application of the present invention.

As to the value of PES, the closer to zero, the higher the servo stability. The cylinder number plotted along the axis of abscissa is from 0 to 5000, in which 0 indicates the outer periphery side and 5000 indicates the inner periphery side. As shown in FIG. 9, the servo stability improving effect is more outstanding on an outer side (cylinder number 0 side) of the disk. In FIG. 8, the cylinder numbers 0 to 10 in FIG. 7 are extracted, and in FIG. 10, the cylinder numbers 0 to 10 in FIG. 9 are extracted.

In FIGS. 7 to 10 there are shown three data which are RRO, NRRO, and a square mean value (ALL) of both RRO and NRRO values. As mentioned above, RRO is a runout caused by rotation of the motor, corresponding to oscillation which occurs with a certain period proportional to the rotational frequency. RRO is not improved even with the flow uniforming wall formed in the inlet port. However, it is seen that the value of NRRO is smaller in the comparative example than in the embodiment. RRO can be eliminated by a signal processing, while NRRO is difficult to be eliminated because it is a runout not synchronized with rotation. But it is seen that NRRO is diminished by forming the flow uniforming wall in the inlet port in accordance with the present invention.

FIGS. 7 to 10 show the results of measurement made for 2.5 type HDDs of 7200 rpm. The time (cleanup time) required for the collection of dust is about 20 seconds even with the flow uniforming wall formed below the inlet port 221. Increasing flutter caused by discontinuity of the flow uniforming wall in HDD of high-speed rotation can be prevented. Further, the effect of dust collection by the circulation filter is little affected.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk device comprising:
a rotatable disk;
a base and a top cover for housing said disk inside;
a flow uniforming wall disposed along an outer periphery of said disk;
a circulation filter configured to collect dust present within the device; and
a plurality of disks,
wherein said flow uniforming wall having an opening formed in a position other than the position directly opposed to the outer periphery of said disk, allowing an air flow created with rotation of the disk to be admitted through said opening,
wherein said flow uniforming wall has a first opening in a position between a top surface of said disk and said top cover, allowing an air flow created with rotation of the disk to be admitted through said first opening and,
wherein said flow uniforming wall has a second opening positioned in a gap between said plurality of disks, allowing an air flow created with rotation of the disks to be admitted through said second opening.

2. A disk device according to claim 1, wherein said flow uniforming wall has a third opening between a lowest surface of said disks and a bottom of said base, allowing an air flow created with rotation of the disks to be admitted through said third opening.

3. A disk device comprising:
a rotatable disk;
a base and a top cover for housing said disk inside;
a flow uniforming wall disposed along an outer periphery of said disk; and
a circulation filter configured to collect dust present within the device;
wherein said flow uniforming wall having an opening formed in a position other than the position directly opposed to the outer periphery of said disk, allowing an air flow created with rotation of the disk to be admitted through said opening,
wherein said flow uniforming wall has a first opening in a position between a top surface of said disk and said top cover, allowing an air flow created with rotation of the disk to be admitted through said first opening and,
wherein said flow uniforming wall has a third opening between a lowest surface of said disk and a bottom of said base, allowing an air flow created with rotation of the disk to be admitted through said third opening.

4. A disk device comprising:
a rotatable disk;
a base and a top cover for housing said disk inside;
a flow uniforming wall disposed along an outer periphery of said disk; and
a circulation filter configured to collect dust present within the device,
wherein said flow uniforming wall having an opening formed in a position other than the position directly opposed to the outer periphery of said disk, allowing an air flow created with rotation of the disk to be admitted through said opening and,
wherein said flow uniforming wall has a third opening between a lowest surface of said disk and a bottom of said base, allowing an air flow created with rotation of the disk to be admitted through said third opening.

5. A disk device comprising:
a rotatable disk;
a base and a top cover for housing said disk inside;
a flow uniforming wall disposed along an outer periphery of said disk;
a circulation filter configured to collect dust present within the device; and
a plurality of disks,
wherein said flow uniforming wall having an opening formed in a position other than the position directly opposed to the outer periphery of said disk, allowing an air flow created with rotation of the disk to be admitted through said opening and,
wherein said flow uniforming wall has a second opening positioned in a gap between said plurality of disks, allowing an air flow created with rotation of the disks to be admitted through said second opening.

6. A disk device according to claim 5, wherein said flow uniforming wall has a third opening between a lowest surface of said disks and a bottom of said base, allowing an air flow created with rotation of the disks to be admitted through said third opening.

7. A disk device comprising:
a rotatable disk;
a base and a top cover for housing said disk inside;
a flow uniforming wall disposed along an outer periphery of said disk; and
a circulation filter configured to collect dust present within the device,
wherein said flow uniforming wall having an opening formed in a position other than the position directly opposed to the outer periphery of said disk, allowing an air flow created with rotation of the disk to be admitted through said opening and,
wherein said flow uniforming wall has a first opening in a position between a top surface of said disk and said top cover, allowing an air flow created with rotation of the disk to be admitted through said first opening, and further comprising a gasket for sealing said top cover and said base, and the height of said first opening in the direction of a rotational axis of said disk is equal to the thickness of said gasket.

8. A disk device comprising: at least one rotatable disk;
a base and a top cover for housing said at least one disk inside;

a flow uniforming wall disposed along and spaced from an outer periphery of said at least one disk;
a circulation filter configured to collect dust present within the device; and
a plurality of disks,
wherein said flow uniforming wall has at least one inlet opening to allow an air flow created with rotation of said at least one disk to be admitted through said at least one inlet opening, said at least one inlet opening being not directly opposed to the outer periphery of said at least one disk,
wherein said flow uniforming wall has a first inlet opening in a position between a highest surface of said at least one disk and said top cover, allowing an air flow created with rotation of the at least one disk to be admitted through said first inlet opening and,
wherein said flow uniforming wall has a second inlet opening positioned in a gap between an adjacent pair of said plurality of disks, allowing an air flow created with rotation of the disks to be admitted through said second inlet opening.

9. A disk device according to claim 8, wherein said flow uniforming wall has a third inlet opening between a lowest surface of said disks and a bottom of said base, allowing an air flow created with rotation of the disks to be admitted through said third inlet opening.

10. A disk device comprising:
at least one rotatable disk;
a base and a top cover for housing said at least one disk inside;
a flow uniforming wall disposed along and spaced from an outer periphery of said at least one disk; and
a circulation filter configured to collect dust present within the device,
wherein said flow uniforming wall has at least one inlet opening to allow an air flow created with rotation of said at least one disk to be admitted through said at least one inlet opening, said at least one inlet opening being not directly opposed to the outer periphery of said at least one disk,
wherein said flow uniforming wall has a first inlet opening in a position between a highest surface of said at least one disk and said top cover, allowing an air flow created with rotation of the at least one disk to be admitted through said first inlet opening and,
wherein said flow uniforming wall has a third inlet opening between a lowest surface of said at least one disk and a bottom of said base, allowing an air flow created with rotation of said at least one disk to be admitted through said third inlet opening.

11. A disk device comprising:
at least one rotatable disk;
a base and a top cover for housing said at least one disk inside;
a flow uniforming wall disposed along and spaced from an outer periphery of said at least one disk; and
a circulation filter configured to collect dust present within the device,
wherein said flow uniforming wall has at least one inlet opening to allow an air flow created with rotation of said at least one disk to be admitted through said at least one inlet opening, said at least one inlet opening being not directly opposed to the outer periphery of said at least one disk,
wherein said flow uniforming wall has a third inlet opening between a lowest surface of said at least one disk and a bottom of said base, allowing an air flow created with rotation of said at least one disk to be admitted through said third inlet opening.

12. A disk device comprising:
at least one rotatable disk;
a base and a top cover for housing said at least one disk inside;
a flow uniforming wall disposed along and spaced from an outer periphery of said at least one disk;
a circulation filter configured to collect dust present within the device; and,
a plurality of disks,
wherein said flow uniforming wall has at least one inlet opening to allow an air flow created with rotation of said at least one disk to be admitted through said at least one inlet opening, said at least one inlet opening being not directly opposed to the outer periphery of said at least one disk and,
wherein said flow uniforming wall has a second inlet opening positioned in a gap between an adjacent pair of said plurality of disks, allowing an air flow created with rotation of the disks to be admitted through said second inlet opening.

13. A disk device according to claim 12, wherein said flow uniforming wall has a third inlet opening between a lowest surface of said disks and a bottom of said base, allowing an air flow created with rotation of the disks to be admitted through said third inlet opening.

14. A disk device comprising:
at least one rotatable disk;
a base and a top cover for housing said at least one disk inside;
a flow uniforming wall disposed along and spaced from an outer periphery of said at least one disk; and
a circulation filter configured to collect dust present within the device,
wherein said flow uniforming wall has at least one inlet opening to allow an air flow created with rotation of said at least one disk to be admitted through said at least one inlet opening, said at least one inlet opening being not directly opposed to the outer periphery of said at least one disk and,
wherein said flow uniforming wall has a first inlet opening in a position between a top surface of said at least one disk and said top cover, allowing an air flow created with rotation of said at least one disk to be admitted through said first inlet opening, and further comprising a gasket for sealing said top cover and said base, and the height of said first inlet opening in the direction of a rotational axis of said at least one disk is equal to the thickness of said gasket.

* * * * *